United States Patent
Woodcock et al.

[19]

[11] Patent Number: 5,612,982
[45] Date of Patent: Mar. 18, 1997

[54] NUCLEAR POWER PLANT WITH CONTAINMENT COOLING

[75] Inventors: Joel Woodcock, Sewickly Twp.; J. Singh Narula, Monroeville, both of Pa.

[73] Assignee: Westinghouse Electric Corporation, Pittsburgh, Pa.

[21] Appl. No.: 509,270

[22] Filed: Jul. 31, 1995

[51] Int. Cl.$^6$ .................................................. G21C 15/00
[52] U.S. Cl. .......................................... 376/298; 376/299
[58] Field of Search ................................. 376/298, 299, 376/367, 295, 296, 314; 165/181, 182, 183

[56] References Cited

U.S. PATENT DOCUMENTS

| | | | |
|---|---|---|---|
| 3,615,848 | 10/1971 | Sibenhorn | 429/24 |
| 4,081,323 | 3/1978 | Gans, Jr. et al. | 376/293 |
| 4,306,426 | 12/1981 | Berthet et al. | 62/3.2 |
| 4,416,850 | 11/1983 | Kodama et al. | 376/313 |
| 4,505,875 | 3/1985 | Wolters et al. | 376/298 |
| 4,753,771 | 6/1988 | Conway et al. | 376/282 |
| 4,998,509 | 3/1991 | Gou et al. | 376/298 |
| 5,049,353 | 9/1991 | Conway et al. | 376/293 |
| 5,163,508 | 11/1992 | Hamos | 165/159 |
| 5,255,296 | 10/1993 | Schultz | 376/299 |
| 5,282,230 | 1/1994 | Billig et al. | 376/299 |
| 5,360,056 | 11/1994 | Forsberg | 376/299 |

FOREIGN PATENT DOCUMENTS

| | | | |
|---|---|---|---|
| 3518174 | 12/1986 | Germany | 376/299 |
| 2-170097 | 6/1990 | Japan | 376/298 |

*Primary Examiner*—Daniel D. Wasil

[57] ABSTRACT

A passive nuclear power plant includes a reactor vessel enclosed by a containment shell. An in-containment cooling system piped with an out-of-containment heat sink, includes an in-containment heat exchanger vertically extending adjacent the sidewall of the containment shell for inducing natural circulation of the air in the containment shell. The heat exchanger has substantially parallel water-conducting pipes with cooling fins vertically extending therefrom for transferring heat from the naturally circulating air and for condensing steam from the atmosphere.

10 Claims, 3 Drawing Sheets

NUCLEAR POWER PLANT WITH CONTAINMENT COOLING

BACKGROUND OF THE INVENTION

This invention relates to a nuclear power plant having a containment structure enclosing a nuclear reactor vessel and more particularly to a power plant having a containment structure which can be passively cooled should a postulated design basis event occur.

Commercial nuclear power plants generally have reactor vessels, steam generators and auxiliary equipment enclosed within single or double containment structures designed to contain radioactive materials in the atmosphere surrounding the vessels, piping and auxiliary equipment when the plants are operational or in the course of postulated design basis events such as earthquake, equipment failure, electrical interruption and the like. Single containment structures generally have cylindrical sidewalls with top and bottom domed ends. Double containment structures generally have two generally concentric, spaced apart sidewalls and domed ends. Generally speaking, the pressure in the annulus between the concentric containment walls is maintained slightly below atmospheric pressure to minimize leakage from within the containment structure to the environment.

Conventional nuclear power plants also have containment cooling systems designed to transfer heat from within the containment structures in the course of operation or in the course of postulated design basis events. Thus, for example, in-containment air conditioning units or circulating water systems including in-containment piping arrangements or heat exchangers may be utilized to transfer heat from the atmosphere within the containment structures to ultimate heat sinks such as the general plant atmosphere and nearby rivers via cooling towers or other types of heat exchange devices located outside of the containment structure. These plants have active components such as fans and pumps for circulating air in the containment structures and water through the heat exchangers in order to drive the heat transfer across the heat transfer surfaces of the cooling systems. However, in the event of equipment or electrical failure, these cooling systems may not be sufficient to transfer sufficient heat from the containment structure in all postulated design basis events in order to control the temperature and pressure of the containment atmosphere.

Future nuclear plants will include "passive" systems for safely continuing to operate for an extended period of time to shutdown a plant without electrical power or human intervention after the postulated occurrence of a design basis event. U.S. Pat. Nos. 4,753,771 and 5,049,353, both to Conway et al. and assigned to the assignee of the present invention, disclose a passive containment cooling system which will function in nuclear power plants having pressurized water reactors or boiling water reactors without active components. The cooling system utilizes naturally induced air flow within the containment vessel, thermal conduction through a containment shell and gravity flow of water over the containment shell to passively transfer heat generated in the reactor vessel and other process equipment to the general atmosphere surrounding the containment structure. Such passive systems and other passive safety grade systems are designed to function for relatively long periods of time up to about seventy-two hours or more without the need for human actions, AC power or heating and air conditioning in the event of the occurrence of a postulated design basis accident.

The passive cooling systems of U.S. Pat. Nos. 4,753,771 and 5,049,353 are designed to be used in connection with single containment structures to cool the atmosphere within the containment and to condense steam which may be released into the containment atmosphere. Such passive cooling systems (which depend upon thermal conduction through the containment shell) are not likely to be utilized in connection with plants having double containment structures because the inherent resistance to heat transfer through concentric shells and an intermediate air space severely reduces heat transfer through the containment walls. In addition to the resistance to thermal conduction presented by two spaced walls, thermal convection of the air in the annular space between the spaced walls of double containment designs will be reduced because the annular space will be sealed and the air filtered.

SUMMARY OF THE INVENTION

It is an object of the present invention to provide a nuclear power plant with a highly reliable, efficient containment cooling system capable of transferring large amounts of heat from within the containment structure during power operation or in the course of a postulated design basis event.

The present invention resides in a nuclear power plant including a reactor vessel enclosed within a (single or double) containment structure having a sidewall and a domed top end cooled by a containment cooling system piped with an out-of-containment heat sink. The containment cooling system includes an in-containment heat exchanger vertically extending adjacent to the sidewall of the containment structure and having substantially parallel pipes with cooling fins vertically extending therefrom for transferring large amounts of heat and condensing steam from the atmosphere within the containment structure.

In a preferred embodiment, the water-conducting pipes are between a backing plate adjoining the fins and air baffles for directing the flow of air and condensed steam. Advantageously, this structure mechanically supports the pipes and fins. Also, the in-containment heat exchanger induces natural circulation of atmosphere and condensate along the adjacent sidewall of the containment structure to increase heat transfer to the adjacent containment wall.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

DESCRIPTION OF THE PREFERRED EMBODIMENT

Figure 1:
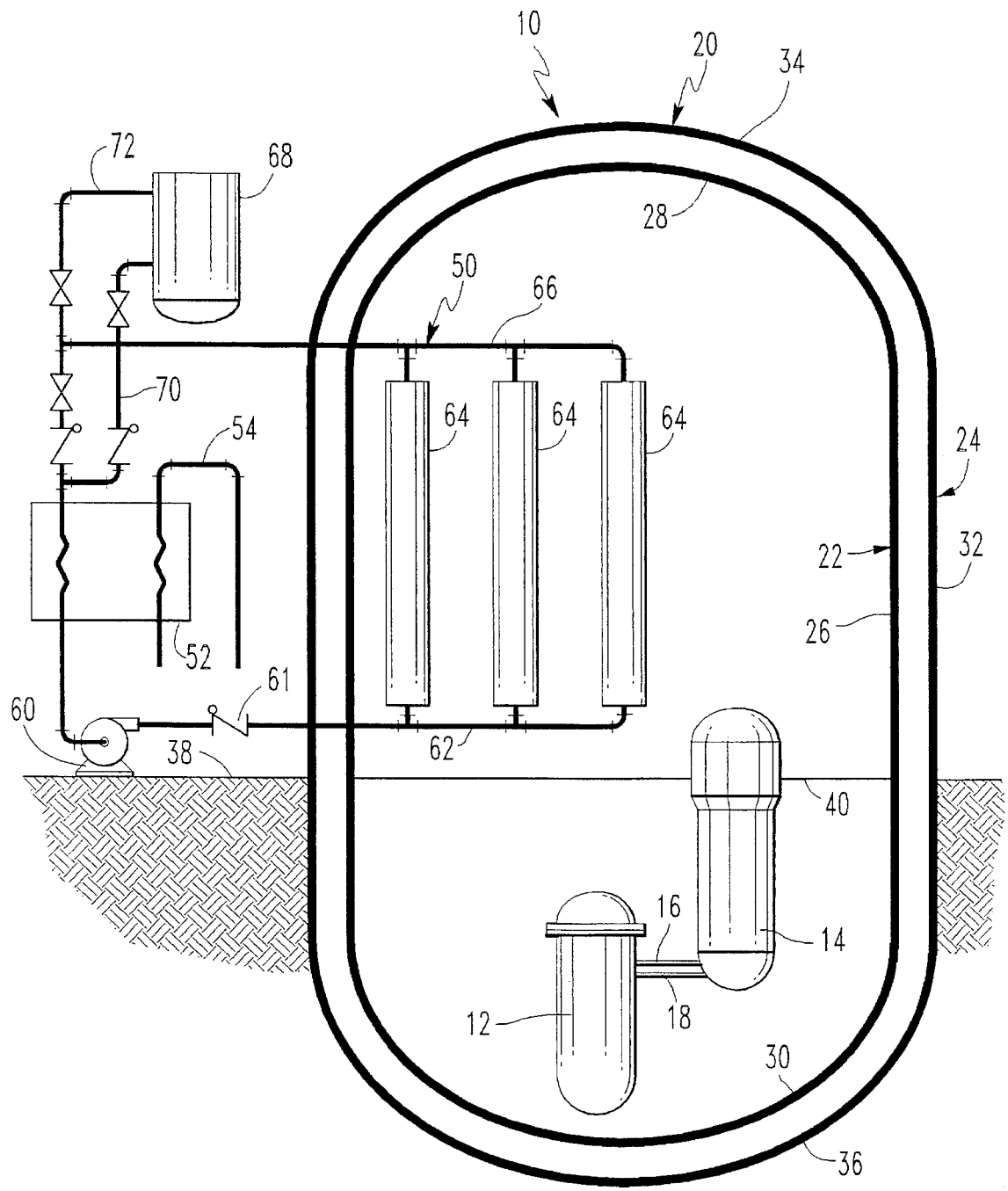
FIG. 1 is a schematic representation showing a nuclear power plant embodying the present invention.

Referring now to the drawings in detail and in particular to FIG. 1 there is shown a pressurized water nuclear power plant 10 including a nuclear reactor vessel 12 interconnected with one or more steam generators 14 (illustrated as one steam generator) by a hot leg 16 and at least one cold leg 18. A typical nuclear power plant 10 will have from two to four steam generators 14 coupled with a reactor vessel 12. FIG. 1 generally represents a passive pressurized water reactor facility like that disclosed by U.S. Pat. Nos. 4,753,771 and 5,049,353, which are incorporated by this reference for their discussion of the structure and operation of such plants. The present invention may be employed with other passive plant designs or with conventional active plant designs using air fans, water pumps and like active components. It may also be employed in connection with boiling water reactor plants in addition to pressurized water reactor plants and in connection with spherically shaped containment structures.

The reactor vessel 12 and steam generator 14 of FIG. 1 are located in a double containment 20 including an inner shell 22 generally concentrically spaced from an outer shell 24. The inner shell 22 generally includes a sidewall 26 disposed between a domed top end 28 and a domed bottom end 30. Similarly, the outer shell 24 generally includes a sidewall 32 disposed between a domed top end 34 and a domed bottom end 36. The containment shells 22 and 24 may be fabricated of a metal such as steel or of concrete. The containment structure 20 has various conventional penetrations through the containment shells 22 and 24 for piping, instrumentation and electrical lines and various hatches (not shown) which permit fuel assemblies, personnel and the like to enter and to exit the containment structure 20. As is shown in FIG. 1, the reactor vessel 12 is generally located below the grade 38 of the terrain. The steam generator 14 generally extends about four feet or more above a grade level operating floor 40.

A containment cooling system 50 is piped with an out-of-containment heat sink such as a heat exchanger 52 for transferring heat from within the containment structure 20. The heat exchanger 52 transfers heat from water circulating in the cooling system 50 to water from a plant service water system 54 which then transfers the heat to an ultimate heat sink (not shown) such as an air-cooled cooling tower or a heat exchanger cooled by river water and the like. The containment cooling system 50 generally includes a circulating pump 60 such as a centrifugal pump (which is normally paired with an installed spare pump) located outside of the containment structure 20. The cooling system 50 also has check valves 61 to limit backflows through the circuit. The circulating pump 60 has a suction side connected with the heat sink 52 and a discharge side connected via an inlet header 62 to one or more in-containment heat exchangers 64, and preferably, to a plurality of in-containment heat exchangers 64 substantially surrounding the reactor vessel 12 and steam generators 14. The circulating water then flows from the in-containment heat exchangers 64 to an outlet header 66 and returns to the out-of-containment heat exchanger 52.

The containment cooling system 50 may include a cooling water supply tank 68. FIG. 1 shows a supply tank 68 which is connected via a pipe 70 with the suction of the circulating pump 60 and with the outlet header 66 by a return pipe 72. The supply tank 68 of a passive plant normally will be sized to provide cooling water for up to about seventy-two hours or more in order to provide water to the in-containment heat exchangers 64 in the event the service water system 54 is unavailable. The supply tank 68 may alternatively be designed to help meet initial blowdown requirements to minimize the heat exchanger requirements.

In a plant 10 such as that shown in FIG. 1, the cooling system 50 is designed to continue functioning under all circumstances, even if the circulating pump 60 is unavailable because of mechanical malfunction, power unavailability and the like. Thus, the various heat exchangers 52 and 64 and other parts of the cooling system 50 are preferably sized and otherwise designed to facilitate natural circulation of cooling water through the system 50 and transfer heat from the containment atmosphere for up to about seventy-two hours or more. Accordingly, the normally pumped circulation through the in-containment heat exchangers 64 is upwardly through the heat exchangers 64 to facilitate natural circulation of the water as it is being heated.

The in-containment heat exchangers 64 preferably extend from about the level of the operating floor 40 into the dome top 28 for inducing convective air flow throughout the containment structure 20. Most preferably, the heat exchangers 64 below the operating floor 40 and are configured to curve with the dome top 28 to induce mixing and circulation. Advantageously, this circulation restricts the development of high localized concentrations of hydrogen or other gases in the dome or other areas of the containment structure 20 under all operating conditions. As is best shown in FIG. 2, the heat exchangers 64 extend vertically adjacent the inner containment wall 26 and, most preferably, the heat exchangers 64 are no more than about three feet from the wall 26, for inducing natural flow of the air and condensed steam along the heat exchangers 64 and along the sidewall 26.

Figure 2:
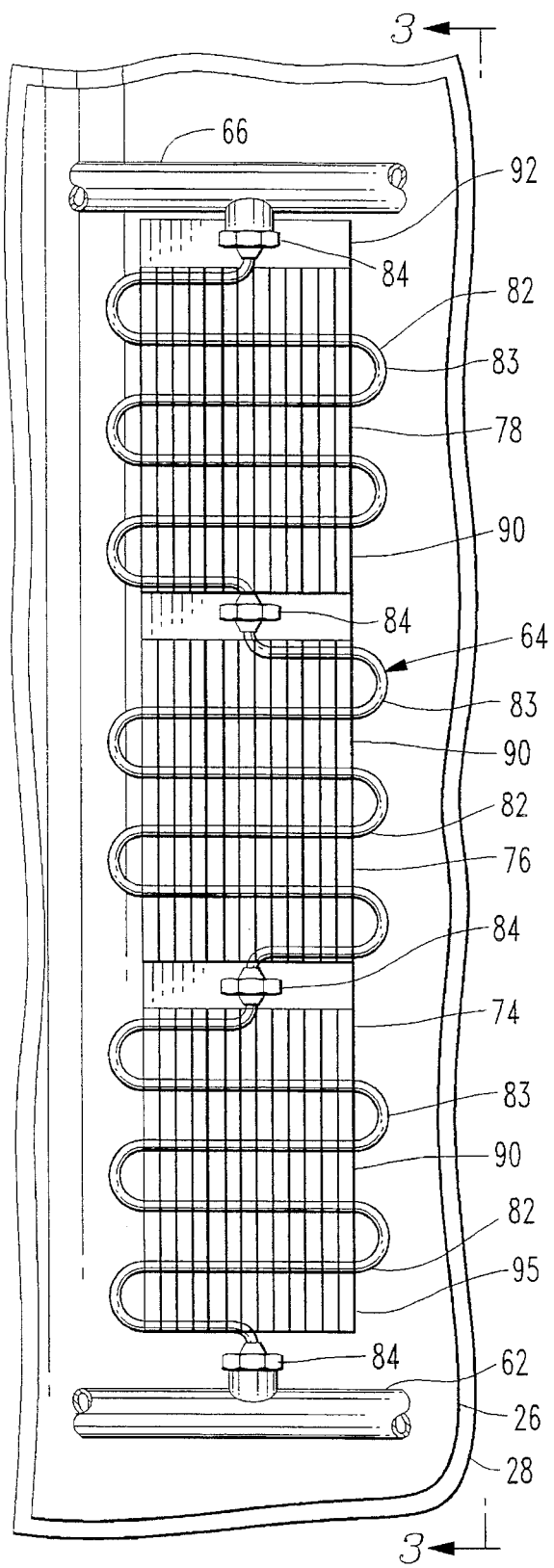
FIG. 2 is an elevation view of a first embodiment of an in-containment heat exchanger shown in FIG. 1.
Figure 3:
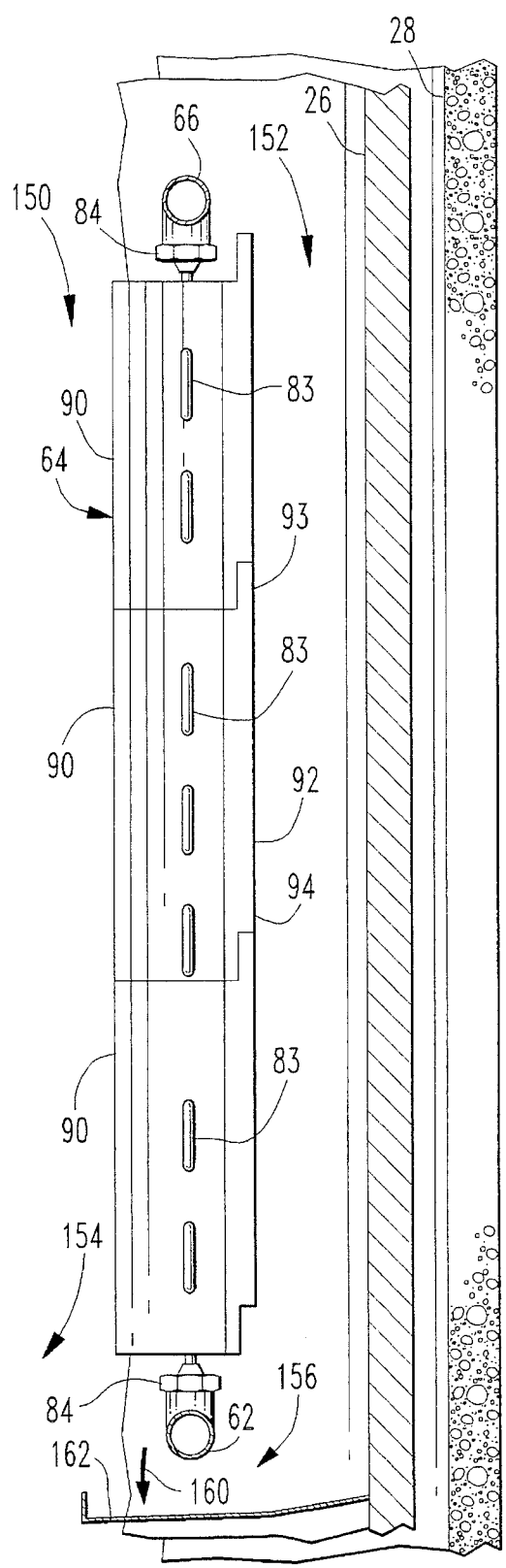
FIG. 3 is an end view of the in-containment heat exchanger shown in FIG. 2 as taken along line 3—3.
Figure 4:
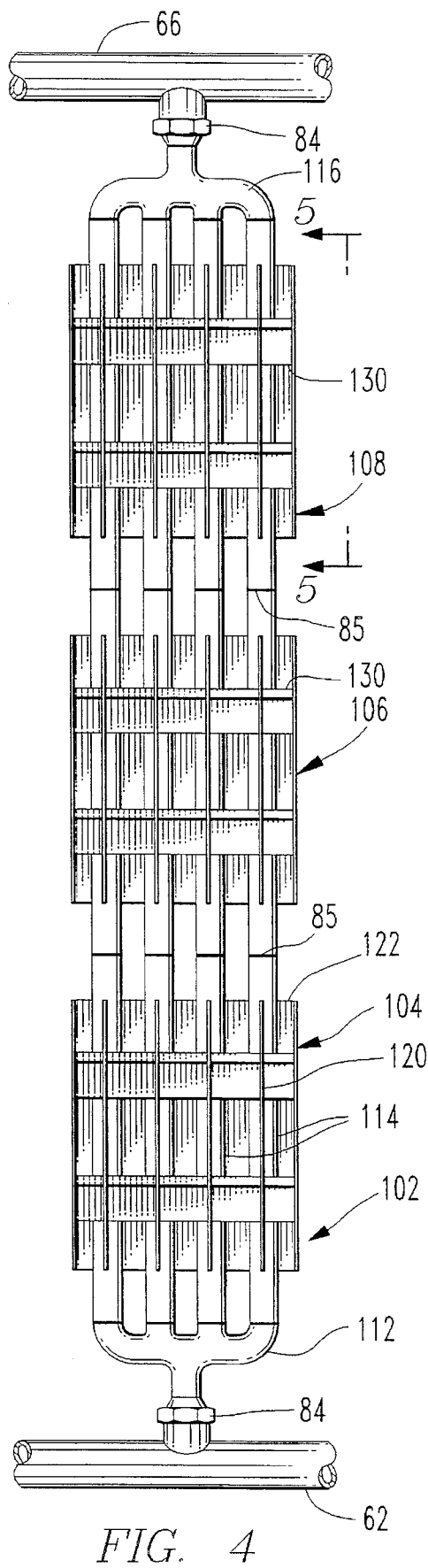
FIG. 4 is an elevation view of a second embodiment of an in-containment heat exchanger shown in FIG. 1.

As is best shown in FIGS. 2 and 3, the in-containment heat exchangers 64 preferably includes several subassemblies 74, 76, 78 which may be assembled at the plant site. The heat exchangers 64 may alternatively be constructed of one assembly (not shown). The heat exchangers 64 may have substantially parallel lengths of water conducting pipes 82 connected in series by 180° bends 83 in a serpentine design. In another design (shown in FIG. 4) the substantially parallel pipes may be manifolded for parallel water flow through the pipes. The pipes 82 may be connected with each other and to the inlet and outlet headers 62, 66 by unions 84 (as is shown by FIG. 2) or by welds 85 (as is shown by FIG. 4). The pipes 82 may be fabricated of carbon or stainless steel or other suitable metal. Also, the pipes 82 may have an inorganic zinc coating for improving the wettability of the heat exchanger 64 in order to condense the steam.

The in-containment heat exchangers 64 have cooling fins 90 extending vertically from the pipes 82 for providing sufficient surfaces for heat transfer and for directing the flow of air and condensed steam downwardly around the periphery of the containment structure 20. The cooling fins 90 are preferably shrunk fit on the pipes 82 and retain their fit under all thermal conditions. The fins 90 may be fabricated of a material such as steel, copper or other suitable material which satisfies the structural and corrosion requirements of the heat exchanger 64. In addition, the fins 90 may have an inorganic zinc coating to enhance their wettability. The fins 90 preferably adjoin a backing plate 92 which structurally reinforces the fins 90 and extends their effective surface. Preferably, the fins 90 are welded to the backing plate 92 and both have an inorganic zinc coating for improving the wettability of the heat exchanger 64 in order to condense the steam. As is best shown in FIG. 3, the backing plates 92 may have configured ends 93, 94 to fit with adjacent backing plates 92.

Figure 5:
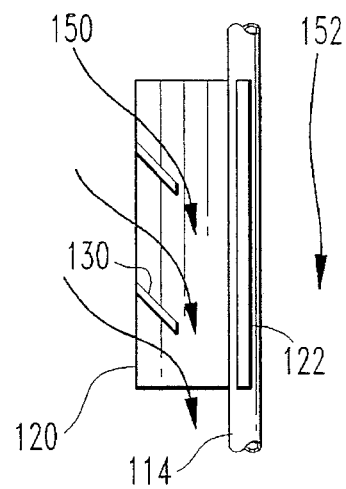
FIG. 5 is a partial end view of the in-containment heat exchanger shown in FIG. 4 as taken along line 5—5.
Figure 6:
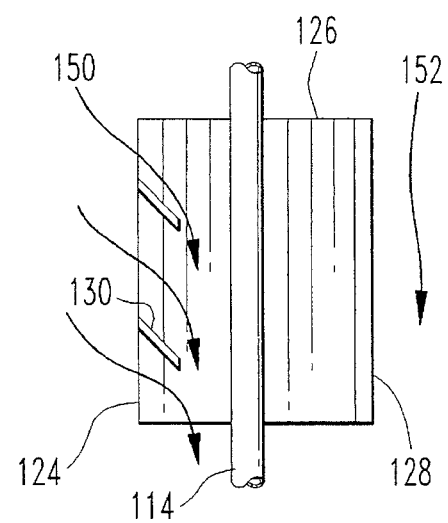
FIG. 6 is a partial end view of an in-containment heat exchanger similar to the heat exchanger shown in FIG. 5.

FIGS. 4 and 5 generally show an in-containment heat exchanger 102 comprised of subassemblies 104, 106 and 108. Cooling water flows upwardly from the inlet header 62 into manifold 112 and then through substantially parallel vertical pipes 114. The cooling water then flows out through manifold 116 and into the outlet header 66. The pipes 114 have vertically extending cooling fins 120. As is best seen in FIG. 5, the pipes 114 may also have cooling fins 122 extending vertically between the pipes 114. Advantageously, the cooling fins 122 may also function as the backing plate 92 shown in FIGS. 2 and 3. Alternatively, and as is shown in FIG. 6, the pipes 114 may have vertical fins 124 and vertical fins 126 oriented at substantially 180° relative to each other. A backing plate 128 adjoining the vertical fins 128 may be employed to mechanically support the fins 128 and to extend the heat transfer surfaces.

As is shown in FIGS. 4–6, there may also be one or more rows of baffles 130 extending horizontally of the fins 120, 124 (and, although not shown, fins 90 in FIGS. 2–3). These baffles 130 slope downwardly toward the pipes 114 for directing the flow of air in the containment structure 20 downwardly along the heat exchanger 104. Preferably, the baffles 130 are oriented so as to permit visual inspection of the pipes 114 and yet block a horizontal view of the pipes 114 for protecting the pipes 114 from damage. FIG. 6 shows an arrangement where both a backing plate 128 and baffles 130 may be employed to structurally reinforce the heat exchanger 102 against hydraulic and thermal transient flows.

A nuclear power plant embodying the present invention is designed to cool the atmosphere and the apparatus in a containment structure 20 in all situations. Studies have shown that nuclear power plants embodying the present invention will experience lower pressure increases upon the occurrence of certain design basis events than will other designs. Referring to FIG. 3, the air in the containment structure 20 naturally circulates downwardly along the heat exchangers 64 and containment sidewall 26 as is shown by flow indicators 150, 152 and then inwardly as is shown by flow indicators 154, 156. The cooled air then contacts equipment and other apparatus located in the interior portions of the containment structure 20, which are at high temperatures, is entrained by rising steam jets or plumes and rises toward the dome area to complete the cycle.

In situations where large amounts of steam are released into the atmosphere, such as in the event of a guillotine pipe break, cooled condensate falls from the bottom of heat exchangers 64 and 102 toward a collection gutter 162 as is shown by the condensate flow indicator 160 in FIG. 3. The collection gutter 162 or other return system may be employed to continue cooling the primary system. For example, the flow of air 156 from between the heat exchangers 64, 114 and the sidewall 26 of the containment structure 20 may entrain at least some of the condensate and carry it to the interior portions of the containment structure 20 where it can contact and cool the apparatus and piping.

The containment cooling system 50 passively circulates water through the system if necessary. If, for example, the circulating pump 60 shown on FIG. 1 malfunctions or there is a power interruption, the water in the containment cooling system 50 circulates by natural convection. If the out-of-containment heat sink 52 is also unavailable, water from supply tank 68 may be circulated through the cooling system 50.

While the preferred embodiments described herein set forth the best mode to practice this invention presently contemplated by the inventors, numerous modifications and adaptations of this invention will be apparent to others skilled in the art. Therefore, the embodiments are to be considered as illustrative and exemplary and it is understood that the claims are intended to cover such modifications and adaptations as they are considered to be within the spirit and scope of this invention.

We claim:

1. A nuclear power plant comprising:

a reactor vessel;

a containment structure enclosing the reactor vessel, the containment structure having a sidewall and a domed top end;

an out-of-containment heat sink; and a containment cooling system piped with the out-of-containment heat sink, the cooling system including an in-containment heat exchanger vertically extending adjacent the sidewall of the containment structure and into the domed top end of the containment structure for transferring heat from atmosphere within the containment structure, the heat exchanger having a plurality of substantially parallel pipes with cooling fins vertically extending therefrom, the finned pipes having inlets elevated above the reactor vessel for inducing natural circulation of atmosphere in the containment.

2. The nuclear power plant of claim 1, wherein the reactor vessel is enclosed within a double containment structure.

3. The nuclear power plant of claim 1, wherein the in-containment heat exchanger has a vertically extending backing plate adjoining the vertically extending fins.

4. The nuclear power plant of claim 1, wherein the in-containment heat exchanger has baffles spaced from the substantially parallel pipes and extending horizontally of the vertically extending fins.

5. The nuclear power plant of claim 1, wherein the substantially parallel pipes are between a vertically extending backing plate adjoining the vertically extending fins and baffles extending horizontally of the vertically extending fins.

6. The nuclear power plant of claim 1 further comprising a steam generator hydraulically connected with the reactor vessel and an operating floor adjacent the steam generator, wherein the in-containment heat exchanger extends from the operating floor into the domed top of the containment structure.

7. The nuclear power plant of claim 1, wherein the substantially parallel pipes of the in-containment heat exchanger are within about three feet of the sidewall of the containment structure for inducing air circulation along the sidewall of the containment structure.

8. The nuclear power plant of claim 1 further including a condensate collection gutter disposed below and spaced from the in-containment heat exchanger for collecting condensate therefrom.

9. The nuclear power plant of claim 8, wherein the condensate collection gutter extends from the sidewall of the containment structure.

10. The nuclear power plant of claim 1, wherein the containment cooling system is adapted to passively transfer heat from the atmosphere within the containment structure to the out-of-containment heat sink.

* * * * *